United States Patent [19]

Hayashi

[11] Patent Number: 4,949,903
[45] Date of Patent: Aug. 21, 1990

[54] PASSENGER ROOM HEATING SYSTEM FOR USE WITH BOILING LIQUID ENGINE COOLING SYSTEM

[75] Inventor: Yoshimasa Hayashi, Kamakura, Japan

[73] Assignee: Nissan Motor Co., Ltd., Yokohama, Japan

[21] Appl. No.: 705,923

[22] Filed: Feb. 26, 1985

[30] Foreign Application Priority Data

Mar. 2, 1984 [JP] Japan ................... 59-40053

[51] Int. Cl.⁵ ............................................ G05D 31/20
[52] U.S. Cl. ............................ 237/2 A; 237/12.3 A; 237/12.3 B; 123/41.21
[58] Field of Search ......... 237/123 R, 12.3 A, 12.3 B; 123/41.21, 41.22

[56] References Cited

U.S. PATENT DOCUMENTS

| | | |
|---|---|---|
| 1,449,741 | 3/1923 | Basso, Jr. |
| 1,632,582 | 6/1927 | Barlow ................ 123/41.21 |
| 2,086,442 | 7/1937 | Rushmore ............ 123/178 |
| 2,413,770 | 1/1947 | Knoy .................... 123/174 |
| 3,384,304 | 5/1968 | Barlow .................. 237/8 |
| 4,549,505 | 10/1985 | Hirano . |
| 4,628,872 | 12/1986 | Ogawa et al. . |
| 4,657,180 | 4/1987 | Hayashi . |

FOREIGN PATENT DOCUMENTS

| | | |
|---|---|---|
| 480649 | 1/1916 | France ................ 123/41.21 |
| 59-18010 | 1/1984 | Japan . |
| 2140911 | 12/1984 | United Kingdom . |

OTHER PUBLICATIONS

U.S. Ser. No. 827,165, filed Feb., 1986 Hayashi et al.

Primary Examiner—Henry A. Bennett
Attorney, Agent, or Firm—Foley & Lardner, Schwartz, Jeffery, Schwaab, Mack, Blumenthal & Evans

[57] ABSTRACT

In order to supply a heat exchanger of the passenger room heating system with sufficiently heated liquid coolant of the boiling liquid engine cooling system, the coolant inlet conduit of the heat exchanger is connected to a coolant jacket of the engine at a position close to highly heated portions of the engine (such as, the combustion chamber walls, exhaust port walls or the like defined in the cylinder head of the engine).

12 Claims, 1 Drawing Sheet

PASSENGER ROOM HEATING SYSTEM FOR USE WITH BOILING LIQUID ENGINE COOLING SYSTEM

BACKGROUND OF THE INVENTION

1. Field of the Invention

The present invention relates in general to a car heater for warming the passenger room of a motor vehicle, and more particularly to a passenger room heating system which is incorporated with a so-called "boiling liquid engine cooling system".

2. Description of the Prior Art

A so-called "boiling liquid engine cooling system (viz., evaporative cooling system)" has been proposed for achieving cooling of an internal combustion engine. This type cooling system basically features an arrangement in which a liquid coolant (for example, water or a mixture of water and antifreeze or the like) in the coolant jacket of the engine is permitted to boil and the gaseous coolant thus produced is passed out to an air-cooled heat exchanger or radiator where the gaseous coolant is cooled and liquefied and then recirculated back into the coolant jacket of the engine. Due to the excellent heat exchange effected between the gaseous coolant in the radiator and the atmosphere surrounding the radiator, the cooling system exhibits a very high performance.

Apart from the above, various kinds of car heaters have been hitherto proposed and put into practical use. However, most of the car heaters hitherto proposed are of a type which is designed for use with a conventional "water cooled type engine cooling system" which uses water in liquid state for cooling the engine.

SUMMARY OF THE INVENTION

It is therefore an object of the present invention to provide a passenger room heating system which is designed for use with a boiling liquid engine cooling system.

According to the present invention, there is provided an improved passenger room heating system for use with a boiling liquid engine cooling system which includes a coolant jacket defined in the engine proper and containing therein a liquid coolant to a certain level to cover the highly heated portions of the engine, a condenser for condensing the gaseous coolant introduced thereinto from the coolant jacket and recirculating means for recirculating the coolant thus liquefied in the condenser back into the coolant jacket. The improved passenger room heating system comprises a heat exchanger exposed to the passenger room of the vehicle, the heat exchanger including a heater core through which a liquid flows for achieving heat exchange between the liquid and air surrounding the heater core, a first conduit extending from the coolant jacket to a coolant inlet of the heat exchanger, a second conduit extending from a coolant outlet of the heat exchanger to the coolant jacket, and pumping means for enforcedly circulating the coolant through the first conduit, the heat exchanger, the second conduit and the coolant jacket in this order, wherein the first conduit is exposed at its open end to the coolant jacket at a position below a certain level of the liquid coolant in the vicinity of the highly heated portions, so that upon operation, the liquid coolant positioned near the highly heated portions is forcedly introduced into the heat exchanger through the first conduit.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figures 1, 2:
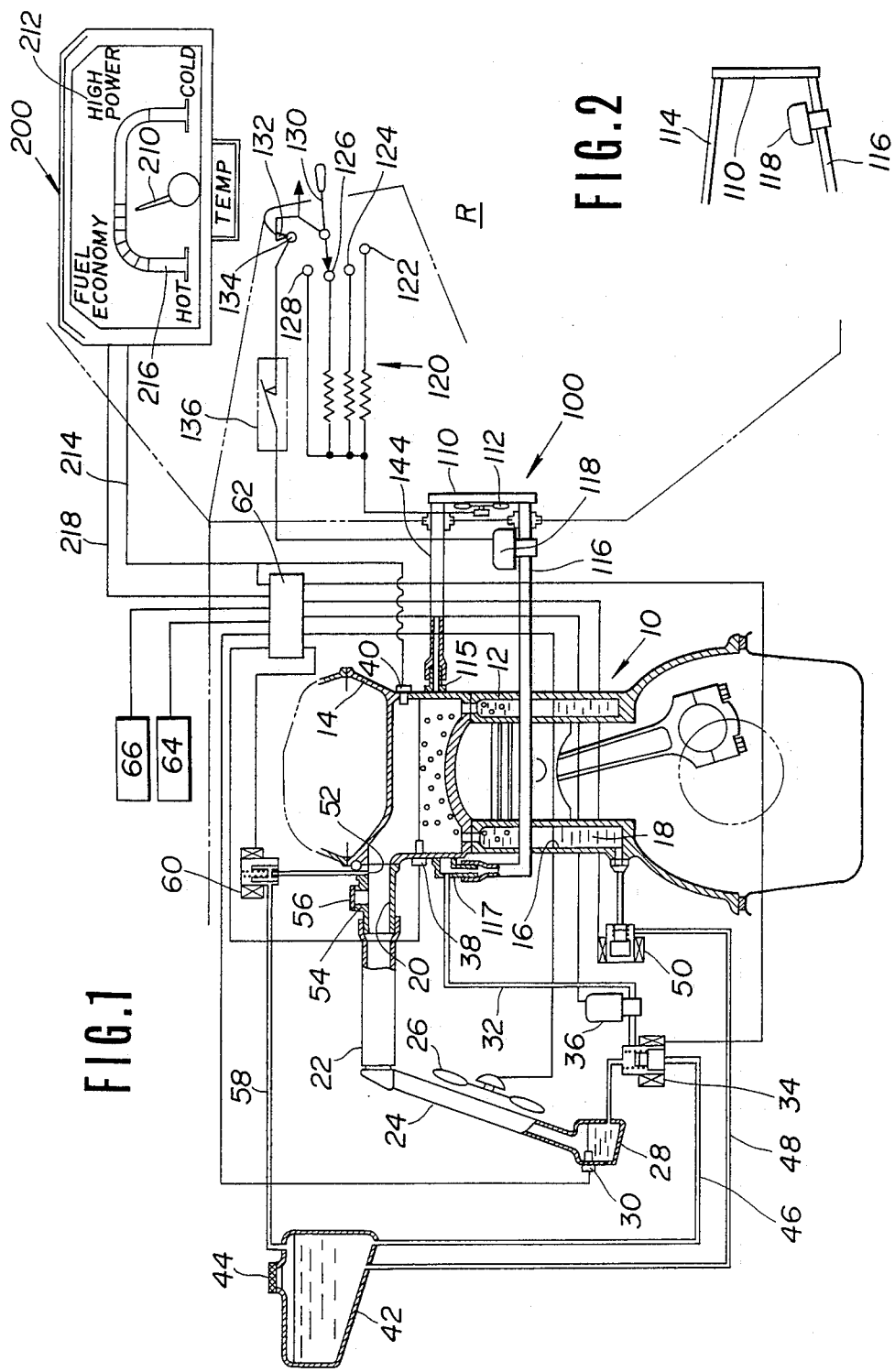
FIG. 1 is a schematical illustration of a passenger room heating system incorporated with a boiling liquid engine cooling system, according to the present invention.
FIG. 2 is a partial view showing a modification of the passenger room heating system of FIG. 1.

Referring to FIG. 1, there is shown an embodiment of the present invention, which is a passenger room heating system incorporated with a boiling liquid cooling system applied to an internal combustion engine. The engine is generally designated by numeral 10 which includes a cylinder block 12 on which a cylinder head 14 is detachably secured. The cylinder head 14 and the cylinder block 12 include suitable cavities which define a coolant jacket 16 about the heated portions of the cylinder head and block. Contained in the coolant jacket 16 is cooling liquid (coolant) 18 which, under normal operation of the system, sufficiently covers the walls of the combustion chambers while maintaining the upper portion of the coolant jacket 16 empty of the liquid coolant, as shown. The liquid coolant boils and evaporates when heated sufficiently by combustion heat of the engine 10, so that under operation of the engine 10, the upper portion of the jacket 16 is filled with coolant vapor.

Fluidly communicating with a vapor discharge port 20 of the cylinder head 14 via a vapor transfer conduit 22 is a radiator or heat exchanger 24. The interior of this radiator 24 is maintained essentially empty of liquid coolant during normal engine operation so as to maximize the surface area available for condensing coolant vapor (via the heat exchange with the ambient atmosphere) and that the cooling system as a whole (viz., the system encompassed by the coolant jacket 16, radiator 24 and conduiting interconnecting same) is hermetically closed when the engine 10 is warmed-up and running. These will become clearer as the description proceeds.

Located adjacent the radiator 24 is an electric fan 26. Defined at the bottom of the radiator 24 is a small collection reservoir or lower tank 28. Disposed in the lower tank 28 is a level sensor 30 which is adapted to output a signal indicative of the level of liquid coolant in the lower tank 28 being lower than a level which is beneath the lower ends of the relatively small diameter tubing which constitute heat exchanging portion of the radiator 24.

Leading from the lower tank 28 to the coolant jacket 16 of the cylinder head 14 is a return conduit 32. As shown, the conduit 32 leads to the coolant jacket 16 at the position close to the combustion chamber walls. The return conduit 32 may be connected to the coolant jacket 16 defined in the cylinder block 12. A three-way type electromagnetic valve 34 and a relatively small capacity electric pump 36 are disposed in the conduit 32. The valve 34 is located upstream of the pump 36.

In order to sense the level of liquid coolant in the coolant jacket 16 and appropriately control the operation of the pump 36, a level sensor 38 is employed which is disposed in the cylinder head 14, as shown. It will be noted that this sensor 38 is arranged at a level higher than that of the combustion chambers and exhaust ports (i.e. structure subject to high heat flux) so as to enable same to be securely immersed in liquid coolant and thus attenuate any engine knocking and the like which might otherwise occur due to the formation of localized zones of abnormally high temperature or "hot spots". It will also be noted that the level sensor 38 is located at a level lower than the upper section or roof of the structure of the cylinder head 14 which defines the coolant jacket therein, so as to define a coolant vapor collection space above the liquid coolant 18.

Located above the level sensor 38 so as not to be immersed in the liquid coolant is a temperature sensor 40.

A coolant reservoir 42 is located beside the engine 10 as shown. An air permeable cap 44 is used to close the reservoir 42 in a manner that atmospheric pressure continuously prevails therein.

The reservoir 42 fluidly communicates with the three-way valve 34 via a supply conduit 46 and the engine coolant jacket 16 via a fill/discharge conduit 48 and an ON/OFF type electromagnetic valve 50. The three way-valve 34 is arranged to establish fluid communication between the lower tank 28 and the coolant jacket 16 when de-energized while establish fluid communication between the coolant jacket 16 and the reservoir 42 when energized. The valve 50 is arranged to close when energized.

The cylinder head 14 is formed near the vapor discharge port 20 with a "purge" port 52 and a riser like portion 54 which is hermetically closed by a cap 56. As shown, the purge port 52 communicates with the reservoir 42 via an overflow conduit 58. A normally closed type electromagnetic valve 60 is disposed in the overflow conduit 58. This valve is arranged to open only when energized.

The above-mentioned level sensors 30 and 38 may be of any suitable type such as float/reed switch types.

As shown, the outputs of the level sensors 30 and 38 and the temperature sensor 40 are fed to a control circuit 62. The control circuit 62 includes therein a microprocessor including input and output interface I/0 a CPU, a RAM and a ROM. Suitable control programs are set in the ROM and are used to control the operation of the valves 34, 50 and 60, pump 36 and fan 26 in response to the various data supplied thereto.

In order that the temperature of the coolant be approximately controlled in response to changes in engine load and speed, a load sensor 64 and an engine speed sensor 66 are arranged to supply date signals to the control circuit 62. The load sensor may take the form of a throttle position switch which is triggered upon the engine throttle valve being opened beyond a predetermined degree. Alternatively, the output of an air flow meter or an induction vacuum sensor may be used. The engine speed signal may be derived from the engine distributor, a crankshaft rotational speed sensor or the like.

A passenger room heating system 100 is incorporated with the above-mentioned engine cooling system. The room heating system 100 includes a heater core or heat exchanger 110 and an electric fan 112 which are arranged in an air transfer duct (not shown) through which the outside air or inside air (that is, recirculated air) flows toward the passenger room "R". The heat exchanger 110 may be of any suitable type.

The inlet of the heat exchanger 110 is fluidly connected to the coolant jacket 16 of the cylinder head 14 via a coolant supply conduit 114 and a connector 115. The connector 115 is secured to the cylinder head 14. It is to be noted that the conduit 114 (that is, the connector 115) is opened to the coolant jacket 16 at a position higher than that of the combustion chambers but lower than that of the level sensor 38. More specifically, the conduit 114 is opened to the position close to the combustion chambers or the exhaust ports (i.e. the portions subject to high heat flux) for the reasons which will become clear hereinafter.

The outlet of the heat exchanger 110 is fluidly connected to the coolant jacket 16 of the cylinder head 14 via a coolant return conduit 116 which has substantially the same inner diameter as the supply conduit 114. In the illustrated embodiment, the return conduit 116 is connected to the afore-mentioned return conduit 32 in the vicinity of the cylinder head 14. That is, similar to the case of the supply conduit 114, it is desirable to locate the outlet end of the return conduit 116 near the highly heated portion but lower than the level sensor 38. A connector 117 secured to the cylinder head 14 is used for connecting the conduits 116 and 32 to the coolant jacket 16.

An electric pump 118 is disposed in the return conduit 116 in order to force the coolant to flow from the heat exchanger 110 to the coolant jacket 16 through the return conduit 116. Preferably, the pump 118 is of a centrifugal type.

The electric pump 118 and the electric fan 112 are connected to a control switch 120 which is manipulated by an operator or driver of the vehicle. The control switch 120 includes a plurality of stationary contacts (four in the illustrated embodiments) 122, 124, 126 and 128 which are connected through different resistors (no numerals) to the electric fan 112. A movable contact 130 is arranged to selectively contact the stationary contacts 122, 124, 126 and 128. The movable contact 130 carries thereon an auxiliary movable contact 132. The auxiliary movable contact 132 is arranged to contact another stationary contact 134 only when the movable contact 130 is in contact with either one of the stationary contacts 122, 124, 126 and 128. The stationary contact 134 is connected through a temperature switch 136 to the electric pump 118. The temperature switch 138 is designed to open when the temperature of the passenger room becomes higher than a predetermined degree. Although not shown in the drawing, the movable contact 130 and the auxiliary contact 132 are connected to an electric power source (battery) which is in turn connected through respective lead lines (not shown) to the electric fan 112 and the electric pump 118. Thus, when the movable contact 130 is brought into contact with one of the stationary contacts, for example, the contact 126, like the case shown in the drawing, the electric fan 112 runs at a speed determined by the resistor associated with the contact 126, and at the same time, the electric pump 118 runs at a predetermined fixed speed. It is important to determine the rotation speed of the pump 118 so as not to produce vortex in the coolant jacket 16.

Prior to initial use, the boiling liquid cooling system is completely filled with coolant (for example, water or a mixture of water and antifreeze or the like) and the cap 56 is securely set in place to seal the system. A suitable quantity of additional liquid coolant is also introduced into the reservoir 42. Although, at this time, by using de-aerated water when initially filling the system and reservoir 42, the system is essentially free of contaminating air etc., over a period of time, non-condensible matter will find its way into the system. For example, the water (coolant) in the reservoir 42 will tend to absorb atmospheric air and each time the system is filled with coolant, a little non-condensible matter will tend to find its way into the system. Further, during given modes of engine operation, negative pressures develop and although the system is operating in a sealed or closed mode at the time, air, little by little, tends to leak into the system via the gasketing and the like defined between the cylinder head 14 and the cylinder block 12 and between the seals defined between conducting and associated elements of the system.

Accordingly, upon start-up of the engine, given that the engine temperature is below a predetermined value (45° C.), a non-condensible matter purge operation is carried out. The purge operation is effected by pumping excess coolant into the system for a predetermined period of time. As the system should be essentially full before the initiation of this operation, the excess coolant, thus introduced, positively displaces any air or the like that might have collected. That is, the purge operation is carried out by energizing valves 50, 34 and 60 and energizing the pump 36 for several tens of seconds. More specifically, the valve 50 is conditioned to assume a closed condition, the valve 60 an open one and the valve 34 conditioned to establish communication between the reservoir 42 and the coolant jacket 16. Thus, the pump 36 inducts liquid coolant from the reservoir 42 via the conduit 46 and forces same into the coolant jacket 16 through the conduit 32. The excess coolant thus introduced accordingly escapes from the top of the system via the overflow conduit 58. Any air or like non-condensible matter is carried out of the system along with the overflowing coolant.

Upon termination of this mode of operation, the system enters a so-called "excess coolant displacement mode" wherein the coolant is permitted to heat, produce vapor pressure and displace itself out of the system back to the reservoir 42 via the conduit 48. In order to achieve this, the valve 50 is deenergized to assume an open state and the valves 60 and 34 are deenergized to respectively assume a closed position and one in which the small collection tank 28 is placed in fluid communication with the coolant jacket 16.

As the coolant is displaced out of the system, the level of liquid coolant falls below that of the level sensor 38. Accordingly, the pump 36 is energized and coolant is pumped from the radiator 24 into the coolant jacket 16 so as to maintain the level of coolant therein at that of level sensor 38. This operation stops when the level of liquid coolant in the small collection tank 28 falls to that of the level sensor 30. Upon termination of this operation, that is, upon termination of the displacement mode, the valve 50 is energized to place the cooling system in a "closed" state.

It will be noted that as the system is initially filled with coolant, as the coolant is not circulated as in a conventional type circulation system, very little heat can be removed from the engine whereby the coolant and the engine rapidly warm up and quickly produce the necessary vapor pressure to carry out the above discussed "displacement" mode of operation.

During normal operation, the vapor produced in the coolant jacket 16 is condensed in the radiator 24. The rate at which the vapor is condensed is controlled in accordance with the engine load and rotational speed.

When the engine is stopped, the coolant will inevitably continue to boil for a short period due to thermal inertia. This tends to generate a slightly superatmospheric pressure within the system. Accordingly, it is deemed advantages to allow the coolant temperature to drop to a level whereat a slightly sub-atmospheric pressure prevails before permitting the system to assume an open state. This obviates the tendency of large quantities of coolant displaced out of the system and ensures that upon the system being placed in an open condition, the coolant stored in the reservoir 42 will be smoothly inducted to fill the system. That is to say, as the vapor condenses, the coolant from the reservoir 42 will be inducted in a manner to replace same and hence completely fill the system. This eliminates the tendency for any atmospheric air to find its way into the system due to the presence of a sub-atmospheric pressure.

If the engine is restarted before the temperature of the coolant has lowered to any notable degree (for example, 45° C.), the system immediately undergoes a "warm start" wherein the purge operation is bypassed and the coolant displaced mode is directly entered.

In the following, operation of the passenger room heating system 100 will be described. For ease of explanation, the description will be made with respect to a condition wherein the engine 10 is under normal operation. As is described hereinabove, under this condition, the level of coolant in the coolant jacket 16 is maintained substantially at that of the level sensor 38, the coolant boils and thus evaporates by absorbing combustion heat of the engine 10 and the vapor thus produced is continuously introduced into the radiator 24 to be condensed.

When, under this normal operation, the movable contact 130 of the control switch 120 is manipulated to assume one selected operative position, for example, the position as shown in the drawing, the electric fan 112 and the electric pump 118 are energized to run. Due to energization of the pump 118, the heated liquid coolant in the coolant jacket 16 is forced to flow through the supply conduit 114 into the heat exchanger 110 where heat exchange is carried out between the introduced heated liquid coolant and air flow which is produced by the electric fan 112. The air thus warmed is blown into the passenger room R to warm the same. The liquid coolant thus slightly cooled in the heat exchanger 110 is returned back to the coolant jacket 16 of the engine 10 through the return conduit 116.

It will be noted that as the coolant inlet opening of the supply conduit 114 is located adjacent the portions subject to high heat flux, sufficiently heated liquid coolant can be supplied to the heat exchanger 110 thereby allowing the heat exchanger 110 to carry out effective room heating with a small amount of liquid coolant therein. Furthermore, positioning the inlet opening of the supply conduit 114 to the described portion can induce rapid warm-up of the passenger room heating system 100 even when the engine 10 is not warmed sufficiently. This is because, upon starting of the engine 10, the liquid coolant 18 covering the quickly heated portions, such as the combustion chamber walls, the exhaust port walls or the like (which are the portions subject to high heat flux) is warmed or heated quickly as compared with that in the other portions. In practice, the warm-up of the passenger room heating system 100 is achieved very quickly because, in addition of the above-mentioned reason, the coolant used 1 in the evaporative cooling system is very small as compared with a conventional water-cooled type engine cooling system. Accordingly, the passenger in the vehicle can enjoy room heating instantly after engine start.

As the electric pump 118 runs at a predetermined fixed speed irrespective of the position which the control switch 120 assumes, fixed amount of heated liquid coolant is constantly circulated in the room heating system 100 even when the engine 10 is under idling or the vehicle is under low speed moving. Accordingly, even or constant heating of the passenger room R .is expected throughout various operation modes of the engine 10. If the supply conduit 114 and the return conduit 116 have equal inner cross sections like in the illustrated embodiment, undesirable vortex, which might otherwise occur in the coolant jacket 16, is not produced or is at least minimized.

When, as is shown in FIG. 2, the supply conduit 114 and the return conduit 116 are inclined relative to the heat exchanger 110, the heat exchanger 110 is prevented from having an air pocket formed therein.

Designated by numeral 200' is an indicator which monitors the condition of the engine cooling system from within the driver's room. The indicator 200 comprises a pointer 210 and a dial board 212. Although not shown in the drawing, a known electric mover is associated with the pointer 210 and connected to the control circuit 62 through a suitable lead wire 214, so that the pointer 210 indicates the temperature of coolant in the coolant jacket 16 in accordance with a signal issued from the temperature sensor 40 mounted therein. For this indication, graduations 216 are provided on the dial board 212, as shown. The dial board 212 is constructed of a transparent or translucent material and provided at its back side with red and blue lamps (not shown) which are connected to the control circuit 62 through suitable lead wires 218. Thus, when the lamps are energized selectively, the dial board 212 is illuminated in red or blue. A control is so made that when the temperature of the coolant in the coolant jacket 16 is within a predetermined range, for example, from 90° C. to 110° C., the blue lamp is energized to illuminate the dial board 212 in blue showing that the cooling system operates normally, while, when the temperature of the coolant in the jacket 16 is beyond the range, for example 150° C. or 50° C., the red lamp is energized to illuminate the dial board 212 in red alarming that the cooling system operates abnormally. Accordingly, the operating condition of the cooling system can be visually checked from within the driver's room thereby assuring the safety of the cooling system.

What is claimed is:

1. In a motor vehicle powered by a combustion engine cooled by a boiling liquid cooling system which includes a coolant jacket defined in the engine proper and containing therein a liquid coolant to a certain level to cover highly heated portions of the engine, a condenser for condensing the gaseous coolant introduced thereinto from said coolant jacket and recirculating means for recirculating the coolant thus liquefied in the condenser back into the coolant jacket, a passenger room heating system comprising:

a heat exchanger exposed to the passenger room of the vehicle, said heat exchanger including a heater core through which a liquid flows for achieving heat exchange between the liquid and air surrounding said heater core;

a first conduit means extending from said coolant jacket to a coolant inlet of said heat exchanger;

a second conduit means extending from a coolant outlet of said heat exchanger to said coolant jacket; and pumping means for enforcedly circulating the coolant through said first conduit means, said heat exchanger, said second conduit means and said coolant jacket in this order, wherein said first conduit means is exposed at its open end to the coolant jacket at a position below the certain level of the liquid coolant in the vicinity of said highly heated portions, so that upon operation, the liquid coolant positioned near said highly heated portions is forcedly introduced into the heat exchanger through said first conduit means.

2. A passenger room heating system as claimed claim 1, in which said first conduit means comprises conduit proper and a connector, said connector ring secured to a cylinder head in which said coolant jacket is defined.

3. A passenger room heating system as claimed in claim 2, in which said highly heated portions of the engine are combustion chamber walls and exhaust port walls defined in said cylinder head.

4. A passenger room heating system as claimed in claim 1, in which said first and second conduit means have equal inner cross sections to achieve equal flow rate of the liquid coolant in these two conduit means.

5. A passenger room heating system as claimed in claim 1, in which said second conduit means is exposed at its open end to the coolant jacket at a position below the certain level of the liquid coolant.

6. A passenger room heating system as claimed in claim 5, in which said open end of said second conduit means is positioned in the vicinity of said highly heated portions of the engine.

7. A passenger room heating system as claimed in claim 1, in which said first and second conduit means are arranged to be inclined with respect to said heat exchanger so as to prevent the piping of the room heating system from producing therein an air pocket.

8. A passenger room heating system as claimed in claim 1, further comprising air blowing means which is located near said heat exchanger to produce air stream which flows through said heat exchanger toward the passenger room.

9. A passenger room heating system as claimed in claim 8, in which said air blowing means and said pumping means are an electric fan and an electric pump respectively, which run when electrically energized.

10. A passenger room heating system as claimed in claim 9, further comprising a control switch which controls operations of said electric fan and said electric pump when manually operated.

11. A passenger room heating system as claimed in claim 10, in which said control switch comprises:

a plurality of first stationary contacts which are connected to said electric fan through different resistors;

a movable contact which is selectively contactable to said stationary contacts;

second stationary contact which is connected to said electric pump; and au auxiliary movable contact movable with said movable contact, said auxiliary movable contact being constructed to contact said second stationary contact only when said movable contact is in contact with either one of said first stationary contacts.

12. A passenger room heating system as claimed in claim 11, in which a temperature switch is interposed between said second stationary contact and said electric pump, said temperature switch being constructed to open when the temperature of the passenger room is higher than a predetermined temperature.

* * * * *